Jan. 30, 1973  J. LAWRENSON  3,713,797
MANUFACTURE OF FLAT GLASS
Filed Oct. 27, 1970
6 Sheets-Sheet 1
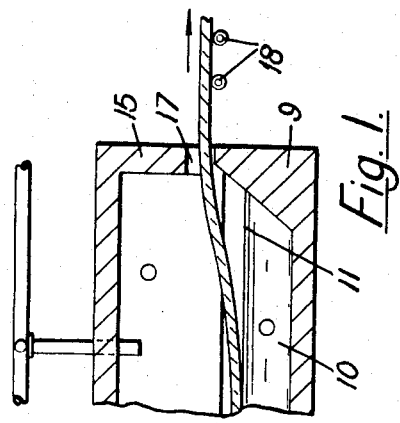
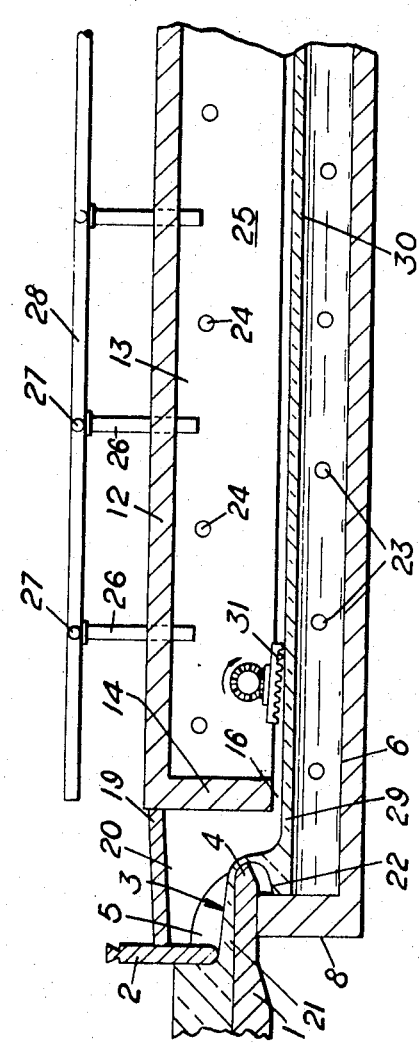
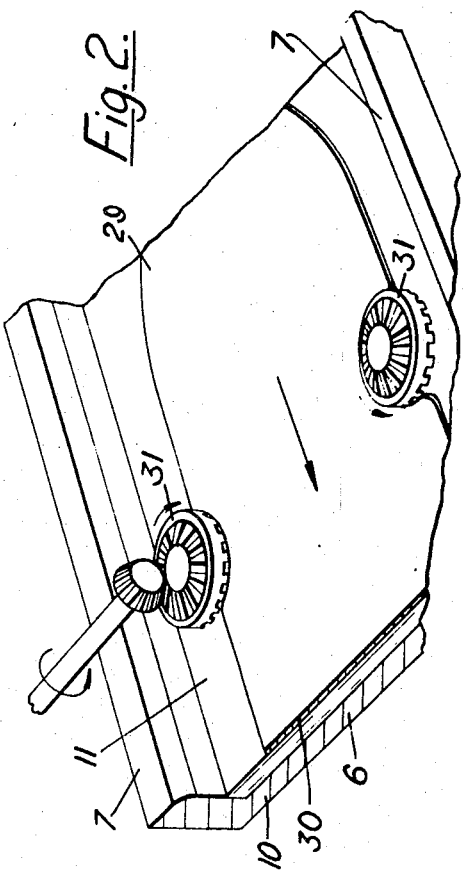
Inventor
JACK LAWRENSON
By Burns, Doane,
Swecker + Mathis
Attorneys

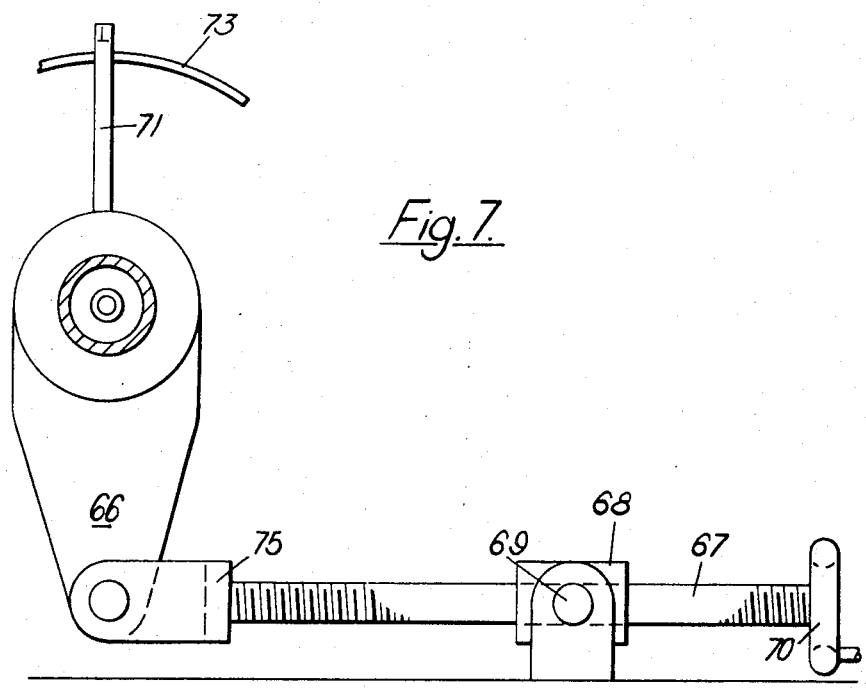

United States Patent Office 3,713,797
Patented Jan. 30, 1973

3,713,797
MANUFACTURE OF FLAT GLASS
Jack Lawrenson, St. Helens, England, assignor to Pilkington Brothers Limited, Liverpool, England
Filed Oct. 27, 1970, Ser. No. 84,347
Claims priority, application Great Britain, Nov. 3, 1969, 53,711/69
Int. Cl. C03b 17/00, 18/00
U.S. Cl. 65—91                                8 Claims

ABSTRACT OF THE DISCLOSURE

Thin float glass, down to about 1.5 mm. thick, is produced by applying lateral stretching forces to a layer of molten glass advancing in ribbon form along a molten metal bath, by means of rotary members engaging the ribbon margins and each oriented so that a part of its periphery engages a margin of the ribbon and impels the glass outwardly to assist the flow of the glass to a desired thickness.

BACKGROUND OF THE INVENTION

This invention relates to the manufacture of float glass in which molten glass is formed into a ribbon on a bath of molten metal which ribbon is advanced along the surface of a bath of molten metal, and cooled as it is advanced until it is sufficiently stiffened to be taken unharmed from the bath.

It is a main object of the invention to provide an improved method of preparing thin float glass, down to about 1.5 mm. thickness, without impairing the flatness, freedom from distortion, and surface quality of the glass.

SUMMARY

The invention provides a method of manufacturing float glass in which an advancing layer of molten glass in ribbon form is formed on a bath of molten metal, and each margin of the molten glass layer is engaged by a rotary member rotating about a vertically disposed axis. The orientation of the rotary members is set so that the part of the periphery of each rotary member which engages the glass impels the glass outwardly thereby accelerating the glass in the plane of the glass layer in a direction to assist the flow of the glass to a desired thickness by subjecting the glass to lateral stretching forces supplementing the gravitational forces causing the molten glass to spread.

BRIEF DESCRIPTION OF THE DRAWINGS

FIG. 1 is a diagrammatic longitudinal sectional view of apparatus according to said embodiment of the invention, FIG. 2 is a diagrammatic fragmentary cut away view of part of the apparatus of FIG. 1, FIG. 7 is an end elevation of the unit of FIG. 6 showing only the angular adjustment means of the said unit.

Throughout the drawings, the same reference numerals are used to indicate the same or like component parts.

DESCRIPTION OF THE PREFERRED EMBODIMENT

Figure 3:
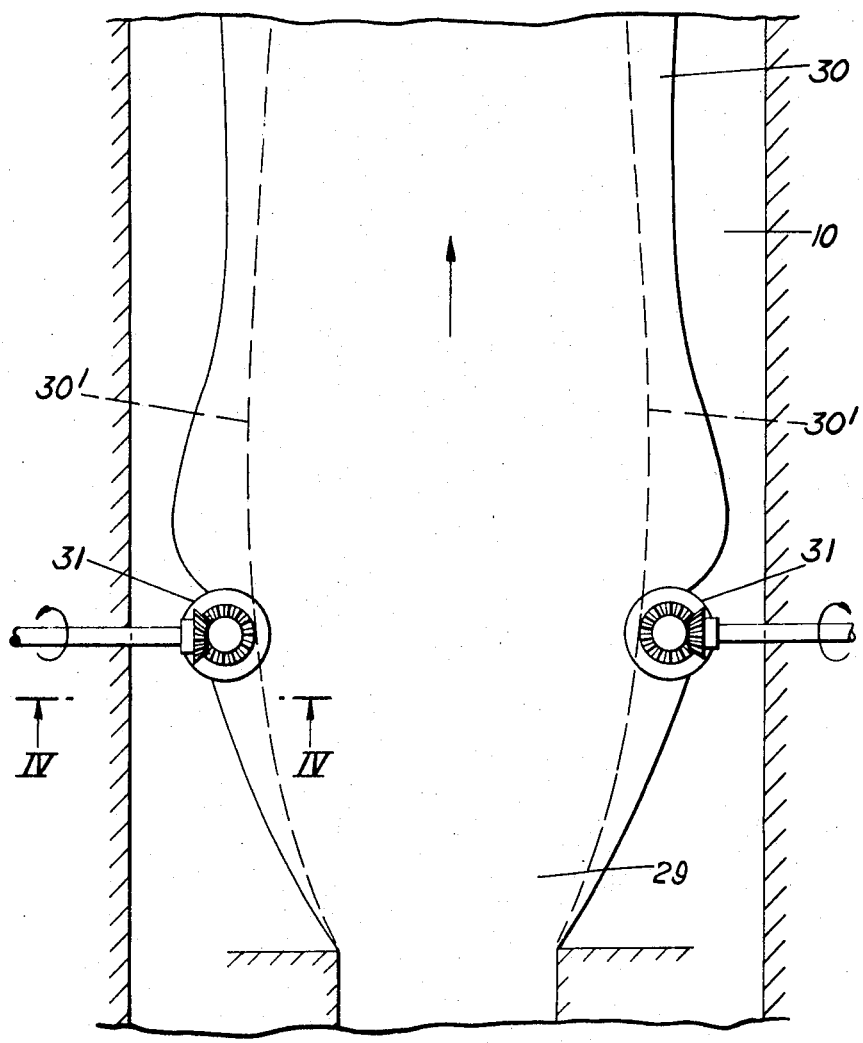
FIG. 3 is a diagrammatic plan view of the apparatus with the roof structure removed, showing the part illustrated in FIG. 2.

Referring to FIG. 1 of the drawings, a forehearth of a continuous glass melting furnace is indicated at 1 and a regulating tweel at 2. The forehearth 1 ends in a spout 3 comprising a lip 4 and side jambs 5, one of which is shown in FIG. 1. The lip 4 and side jambs 5 together constitute a spout of generally rectangular cross-section.

The spout 3 is disposed above the floor 6 of an elongated tank structure including side walls 7 joined together to form an integral structure with the floor 6, an end wall 8 at the inlet end of the tank, and an end wall 9 at the outlet end of the tank. The tank structure holds a bath of molten metal 10 whose surface level is indicated at 11. The bath is, for example, a bath of molten tin or of an alloy of tin in which tin predominates and the bath has a specific gravity greater than that of the glass.

A roof structure is supported over the tank structure and includes a roof 12, side walls 13 and integral inlet and outlet end walls 14 and 15 respectively. The inlet end wall 14 extends downwardly close to the surface 11 of the molten metal 10 to define with that surface an inlet 16 which is restricted in height and through which molten glass is advanced in the form of a ribbon as will be described below. The outlet end wall 15 of the roof structure defines with the outlet end wall 9 of the tank structure an outlet 17 through which the ultimate ribbon of glass produced on the bath is discharged on to driven conveyor rollers 18 mounted outside the outlet end of the tank and disposed somewhat above the level of the top of the end walls 9 of the tank structure so that the ribbon is lifted clear of the wall 9 for discharge through the outlet 17.

The rollers 18 convey the ribbon of glass to an annealing lehr in well known manner and also apply tractive effort to the ribbon of glass to assist in advancing the ribbon as it glides along the surface of the bath 10.

A forward extension 19 of the roof 12 extends up to the tweel 2 and forms a chamber with side walls 20 in which chamber the spout 3 is disposed.

Molten glass 21 is poured on to the bath 10 of molten metal from the spout 3 and the tweel 2 regulates the rate of flow of the molten glass 21 over the spout lip 4. The spout is vertically spaced from the surface 11 of the bath so that the molten glass 21 has a free fall of a few inches, exaggerated in FIG. 1, to the bath surface. This free fall is such as to ensure the formation of a heel 22 of molten glass behind the glass 21 pouring over the spout, which heel 22 extends up to the inlet end wall 8 of the tank structure.

The temperature of the glass is regulated as it is advanced along the bath from the inlet end down to the discharge end by thermal regulators 23 immersed in the bath 10, and thermal regulators 24 mounted in the headspace 25 which is defined over the bath by the roof structure. A protective gas is supplied to the headspace through ducts 26 which are provided at intervals in the roof 12 and which are connected by branches 27 to a head 28 which is connected to a supply of protective gas. Thus a plenum of protective gas is maintained in the headspace 25 which is a substantially closed headspace and there is flow of protective gas through the inlet 16 and the outlet 17.

The temperature of the molten glass is regulated by the thermal regulators 23 and 24 as the glass is advanced along the bath so as to ensure that a layer of molten glass 29 is established on the bath. This layer 29 is advanced along the bath through the inlet 16 and as it is advanced lateral flow of the molten glass occurs under the influence of surface tension and gravity until there is developed from the layer 29 a buoyant ribbon 30 of molten glass which is advanced in ribbon form along the bath. The width of the tank structure at the surface level 11 of the bath is greater than the width of the molten glass ribbon 30 so that there is no limitation to the lateral flow of the molten glass.

The molten glass ribbon 30 is cooled progressively as it is advanced along the bath so that, when it reaches the discharge end of the bath it is sufficiently stiff to be lifted unharmed from the bath by the rollers 18.

To regulate the lateral flow of the molten glass layer 29 on the bath 10, as the buoyant body is being developed the upper surface of opposite margins of the layer are engaged mechanically by a pair of rotary glass-engaging toothed members 31 made of heat-resistant material, for example graphite. Each member 31 is rotating about a vertically disposed axis, whose orientation is selected so that part of the periphery of the rotary member which engages the glass impels the glass outwardly, the direction of rotation of each member 31 being such that this part of the wheel periphery moves in the same sense as the advancing glass layer 29, so that the toothed members 31 impart to the glass an acceleration in the plane of the glass layer to assist the flow of the glass in an equilibrium condition. Normally, as in the illustrated embodiment, the toothed members 31 are arranged so that the lateral force component is outwardly directed, to apply, in effect, a lateral stretching force to the molten glass and thereby to supplement the gravitational forces causing outward lateral flow and thereby assist in overcoming surface tensional forces. The effect of the rotary toothed members 31 is illustrated in FIG. 3, where broken lines 30' show the boundary of the glass in the absence of the members 31. The increase in width of the glass for the same throughput is accompanied by a commensurate decrease in thickness. Longitudinal stretching forces are applied to the glass as a result of the tractive effort applied to the ultimate ribbon by the rollers 18, and the thickness of the ultimate ribbon of float glass produced can be taken down to about 1.5 mm.

If it is desired to increase the thickness of the resulting glass ribbon 30, e.g. to 8 mm., that is, to decrease the width of the ribbon, the rotary members 31 would be arranged so that the net forces exerted on the margins of the glass layer 29 by the members 31 had laterally inwardly directed components.

The impelling action of the toothed members 31 engaging the margins of the glass layer results in an acceleration having both a longitudinal and transverse component being imparted to the glass, the relative magnitudes of these components being dependent upon the position and orientation of the members 31 with respect to the glass layer 29. In the illustrated embodiment, the toothed members 31 are arranged to effect a laterally outward acceleration of the margins of the glass layer 29 so as to apply effectively a transverse "stretch" to the layer 29 as the buoyant body is being formed.

In the embodiment illustrated in FIGS. 2 and 3, the rotary toothed members 31 engage the molten glass layer 29 just developed on the bath to influence the outward flow of the molten glass as the ribbon is formed. Additional members 31 may, however, be positioned so as to engage the margins of the formed ribbon 30 to apply transverse stretching forces to the ribbon 30 so as to regulate the thickness of the ribbon 30 by preventing reduction in the width of the ribbon 30 after its formation. Such compensation for the inwardly action surface tensional forces is particularly desirable where reheating of the glass ribbon 30 is effected as it passes along the bath, for example where the velocity of advance of the ribbon is regulated by edge rolling of the ribbon 30 prior to further attenuation; in this case the members 31 are disposed downstream of the edge rollers which grip the margins of the ribbon.

Alternatively the rotary members may only be employed engaging the formed ribbon to assist in maintaining the ribbon width during attenuation.

Figure 4:
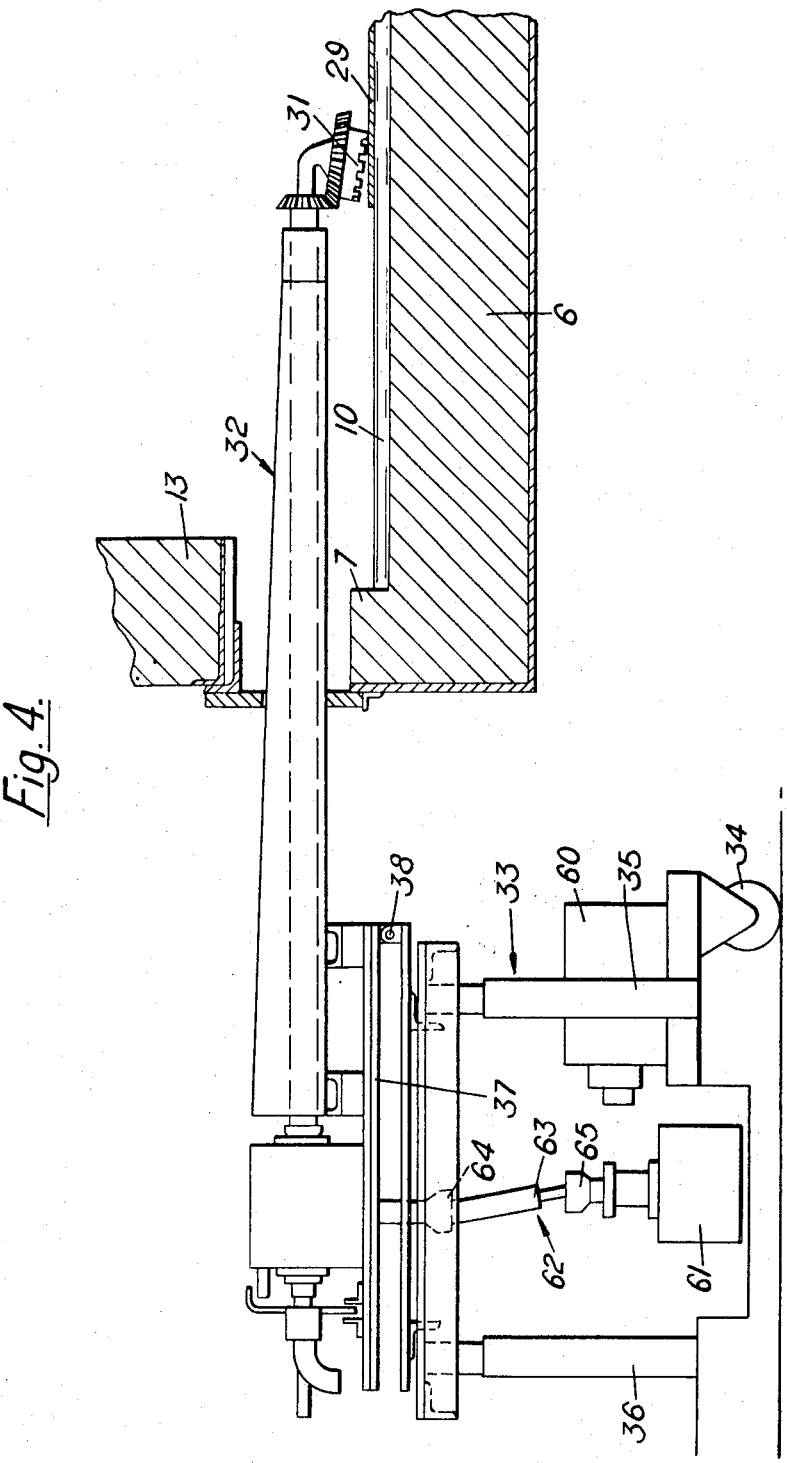
FIG. 4 is a cross-sectional view of part of the said apparatus, taken on line IV—IV of FIG. 3, illustrating the drive and positioning unit for one of the rotary glass-engaging members.

Each toothed member 31 is supported at the inner end of an arm 32, FIG. 4, passing through a sealed aperture between the side wall 13 of the roof structure and the tank side wall 7. Externally of the tank the arm 32 is supported in cantilever fashion on a trolley 33 which is movable on wheels 34 over a horizontal surface to effect adjustment of the position of the toothed member 31 transversely in the tank. The trolley 33 includes front and rear telescopic legs 35, 36 by which the height of the arm 32 and, therefore of the member 31 relative to the bath surface, may be adjusted. The arm 32 is attached to a table 37 which is connected to the trolley 33 by a front horizontal hinge 38. Means (not shown) are provided for adjusting the angular position of the table 37 about the hinge 38 and thereby adjusting the inclination of the table 37 and arm 32 to the horizontal.

Figure 5:
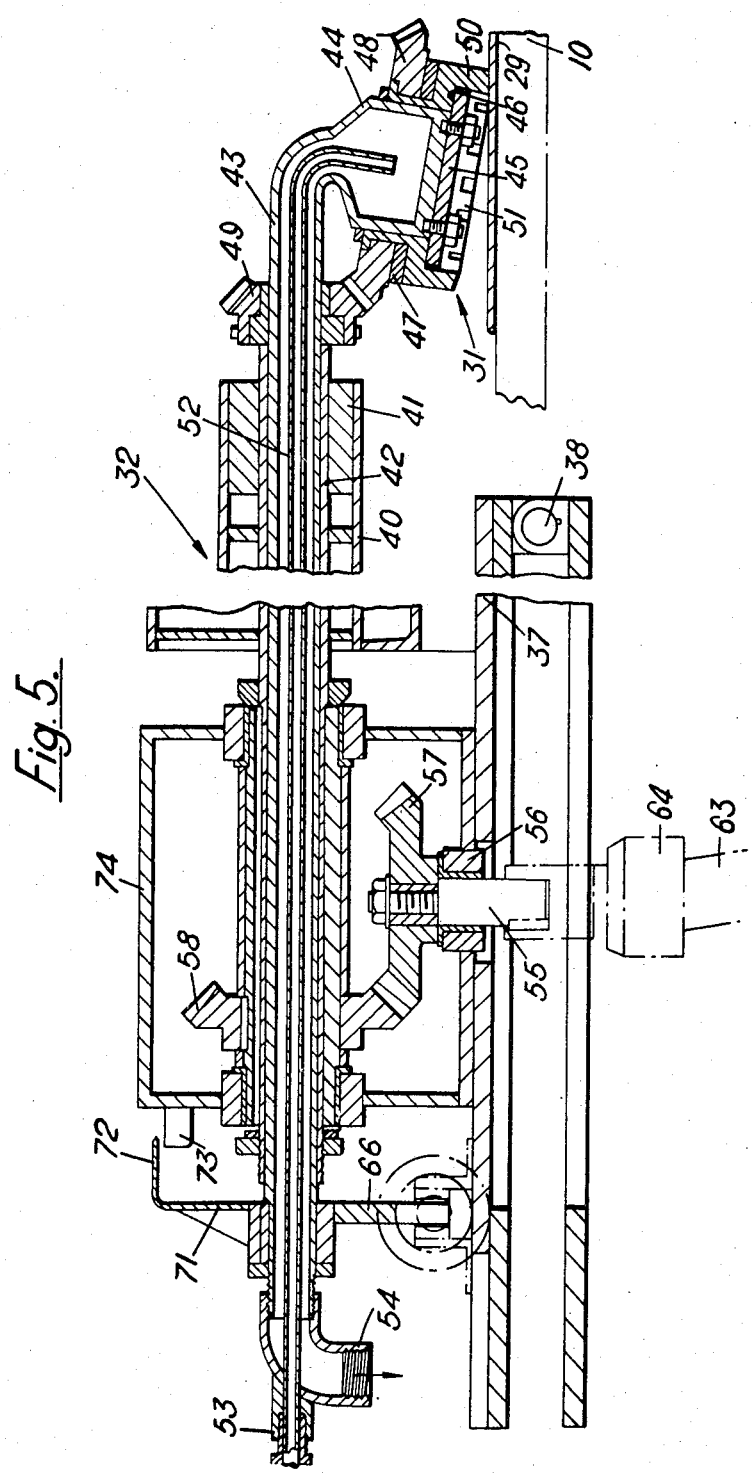
FIG. 5 is a longitudinal cross-sectional view of the unit of FIG. 4.

As shown in the enlarged sectional view of FIG. 5, the arm 32 comprises a hollow sleeve 40 having at its inner end a bearing 41 in which a tubular shaft 42 is rotatably supported. The shaft 42 extends beyond the inner end of the sleeve 40. A stationary tube 43 is mounted coaxially within the tubular shaft 42 and extends beyond the inner end of the shaft 42. At said inner end the tube 43 is provided with an integral hollow housing 44 to the base of which a circular plate 45 is attached, said plate 45 being inclined to the horizontal in a transverse plane of the tank (that is, in the plane of FIG. 5) with its inner edge lowermost.

The plate 45 has a larger diameter than the base of the housing 44, so that it provides an annular seating upon which the rotary glass-engaging member 31 is rotatably supported.

The rotary glass-engaging member 31 is machined from a single piece of graphite and has a substantially tubular shape, with an internal annular shoulder 46 which bears upon the annular seating provided by the plate 45 to permit rotation of the member 31 about its axis relative to the housing 44. The member 31 is also formed externally with an annular row of teeth 47 meshing with corresponding teeth provided on a ring gear 48 having bevel gear teeth meshing with the teeth of a bevel gear 49 secured to the inner end of the tubular shaft 42. The shaft 42 therefore transmits rotary drive to the member 31 through the gears 49, 48 and 47 in all angular settings of the housing 44 about the axis of the tube 43.

The rotary member 31 has an integral depending skirt portion 50 provided with equiangularly spaced-apart teeth 51 which engage the glass layer 29 at or near a marginal region thereof, as described previously.

The chamber 44 has a closed interior through which, in use of the apparatus, a coolant, usually water, is circulated in order to cool the glass-engaging member 31. For this purpose an inner tube 52 is mounted coaxially within the tube 43 and terminates within the chamber 44. Inlet and outlet connections 53, 54 are provided at the outer end of the arm 32 for supplying cooling water to the chamber 44 through the inner tube 52 and withdrawing this water from the chamber 44 through the tube 43.

Rotary drive is transmitted to the tubular shaft 42 from an input shaft 55 extending at right angles to the shaft 42 at the outer end thereof, and rotatably mounted in a bearing 56 in the table 37. The shaft 55 is drivingly connected to the tubular shaft 42 by means of meshing bevel gears 57, 58.

Drive is transmitted to the input shaft 55 from an electric motor 60, FIG. 4, mounted on the trolley 33 by way of a gearbox 61 and a drive transmission 62. The transmission 62 includes a splined shaft 63 having universal joints 64, 65 at its opposite ends. The transmission 62 enables drive to be transmitted to the shaft 42 and, therefore, to the rotary member 31, in all positions of the table 37.

Figure 6:
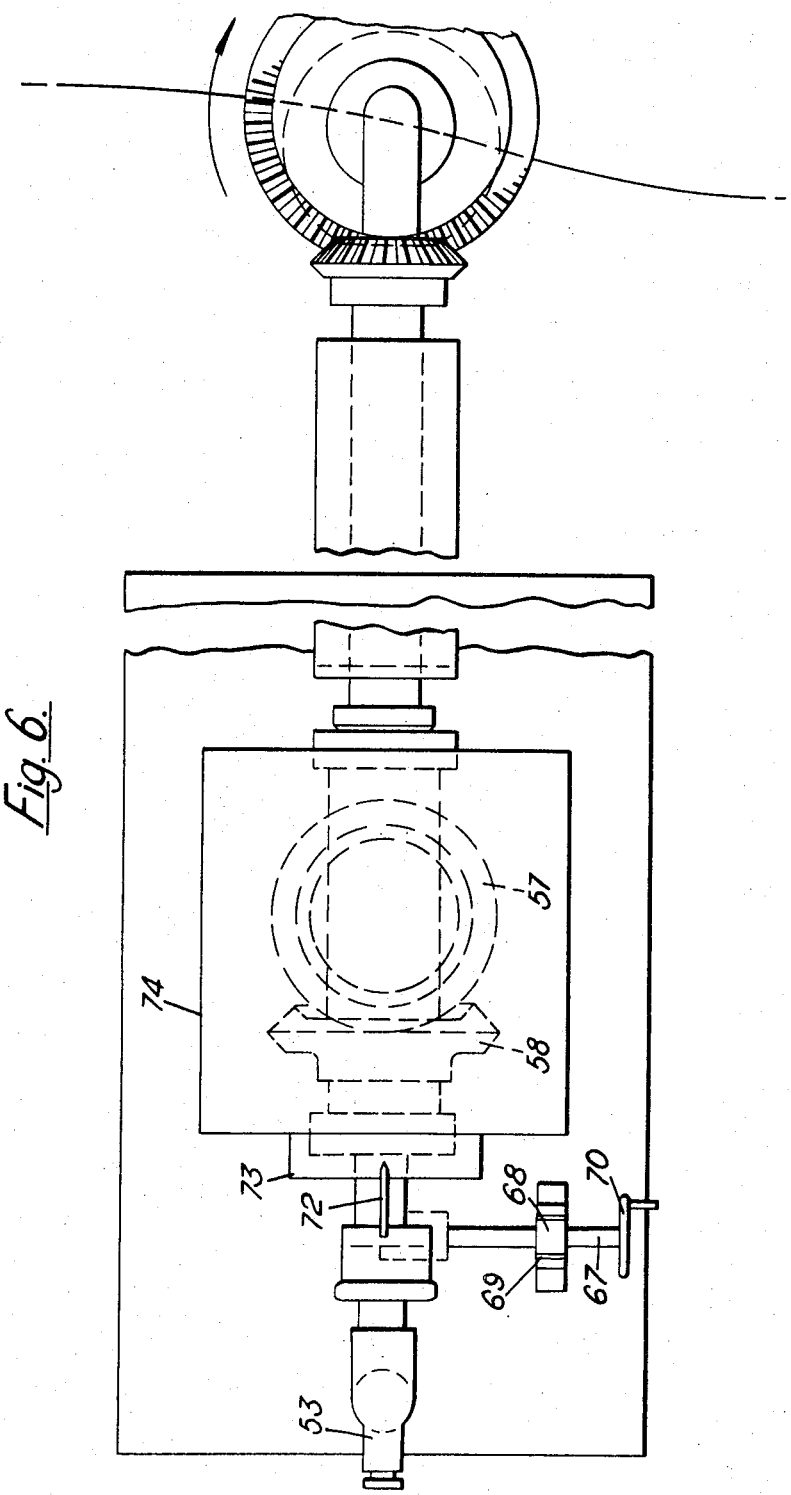
FIG. 6 is a diagrammatic, partly cut away, top plan view of the unit shown in FIGS. 4 and 5.

Means are also provided for adjusting the angular position of the housing 44, and, therefore, the rotary member 31, about the common axis of the shaft 42 and tube 43. These means are illustrated in FIGS. 5, 6 and 7. A crank arm 66 is secured to the outer end of the tube 43. Rotation of the crank arm 66 about the axis of the tube 43 is effected by rotation of a screw-threaded shaft 67 which is pivotally connected to the front end of the crank arm 66 through a clevis 75. The shaft 67 is engaged in a nut 68 which has a pivot connection 69 to the table 37, the axis of the pivot extending parallel to the axis of the tube 43. Rotation of the threaded shaft 67 is effected by means of a hand wheel 70.

An angular adjustment indicator is attached to the outer end of the tube 43 and comprises a radially extending finger 71 having at its radially outer end an axially extending pointer 72 which moves over an arcuate scale 73 fixed relative to the table 37. Conveniently the scale 73 is attached to a housing 74 enclosing bevel gears 57, 58 and mounted on the table 37.

In use of the apparatus the inclination of the arm 32 to the horizontal is adjusted by adjusting the angle of tilt of the table 37 about the hinge 38 and the height of the table 37 adjusted, so that the rotary member 31 engages the molten glass layer 29 only with that part of its periphery which is remote from the sides of the tank as shown in FIG. 5. The orientation of the plane of rotation of the member 31 is adjusted by means of the hand wheel 70 to achieve the desired direction of resultant thrust exerted on the marginal region of the glass layer 29 by the member 31. In the illustrated embodiment this resultant thrust has components longitudinally in the direction of glass advance and transversely in an outward direction.

It will be appreciated that the resultant force applied by each rotary member 31 to the glass 29 can be varied at will by varying the inclination of the axis of rotation of the member 31 relative to the plane of the glass layer and/or by varying the position relative to the respective edge of the layer at which the member 31 engages the glass.

The speed of rotation of the members 31 is adjusted in conjunction with the position and orientation of the members 31 to achieve the desired resultant thickness of the glass ribbon 30.

Conveniently, each member 31 is rotated at a speed such that the peripheral portion which engages the glass travels at substantially the same speed as the glass.

I claim:

1. A method of manufacturing float glas comprising delivering glass at a controlled rate on to a bath of molten metal, thermally regulating the glass so as to form on the bath an advancing layer of molten glass in ribbon form, engaging the upper surface of each margin of said molten glass layer with a rotary member having peripheral teeth and rotating about a generally upstanding axis, and selecting the orientation of the rotary members so that parts of the toothed peripheries of the rotary members which engage the upper surfaces of the margins of the glass impel the glass outwardly and impart to the glass an acceleration in the plane of the glass layer to assist the flow of the glass to a desired thickness.

2. A method of manufacturing float glass comprising pouring molten glass on to a bath of molten metal at a controlled rate, laterally flowing the advancing molten glass on the bath to develop a buoyant body of molten glass which is advanced in ribbon form along the bath, engaging the upper surface of each margin of the laterally flowing molten layer with a rotary member having peripheral teeth and rotating about a generally upstanding axis, and adjusting the orientation of the rotary members so that a part of the toothed periphery of each rotary member which engages the upper surface of the glass impels the glass in the direction of movement of that part of the member and imparts to the glass an acceleration in the plane of the glass layer to assist the flow of the glass to a desired thickness as the ribbon is developed.

3. Apparatus for use in the manufacture of float glass, comprising an elongated tank structure containing a bath of molten metal, means for delivering glass to the bath at a controlled rate and advancing the glass in ribbon form along the bath, thermal regulators associated with the bath for ensuring that the glass is advanced as a buoyant body of molten glass which is cooled as it is advanced until it is sufficiently stiffened to be taken from the bath, a pair of rotary glass-engaging members mounted in the tank structure to engage opposite marginal regions of the upper surface of the glass, the axes of rotation of said members being generally upstanding and each said rotary member having peripheral tooth means for engaging the upper surface of the glass, and means for adjusting the orientation of the rotary members to impart lateral horizontal acceleration to each margin of the glass.

4. Apparatus according to claim 3, wherein each rotary glass-engaging member is formed of heat resistant material.

5. Apparatus according to claim 3, further comprising means for mounting each said rotary glass-engaging member for rotation about its axis, and means for positioning each said member with a part of its toothed periphery engaging the molten glass ribbon at the respective marginal region thereof.

6. Apparatus according to claim 3, wherein each rotary glass-engaging member has an integral depending skirt portion provided with equiangularly spaced apart teeth.

7. Apparatus according to claim 3, including means for adjusting the orientation of the axis of rotation of each rotary glass-engaging member.

8. Apparatus according to claim 7, including drive transmission means for transmitting rotary drive to each rotary glass-engaging member independently and irrespective of the orientation of the axis of rotation of the glass-engaging member.

References Cited

UNITED STATES PATENTS

| | | | |
|---|---|---|---|
| 1,761,234 | 6/1930 | Rowley | 65—91 |
| 3,409,423 | 11/1968 | Lajarte | 65—182 R X |
| 3,450,518 | 6/1969 | Itakura et al. | 65—65 A X |
| 3,468,652 | 9/1969 | Beck | 65—91 |

ROBERT L. LINDSAY, Jr., Primary Examiner

U.S. Cl. X.R.

65—99 A, 182 R